E. N. CHANDLER & T. B. LEWIS.
ELECTRICALLY HEATED WAX POT FOR SHOE SEWING MACHINES.
APPLICATION FILED MAR. 19, 1909.
990,109.
Patented Apr. 18, 1911.
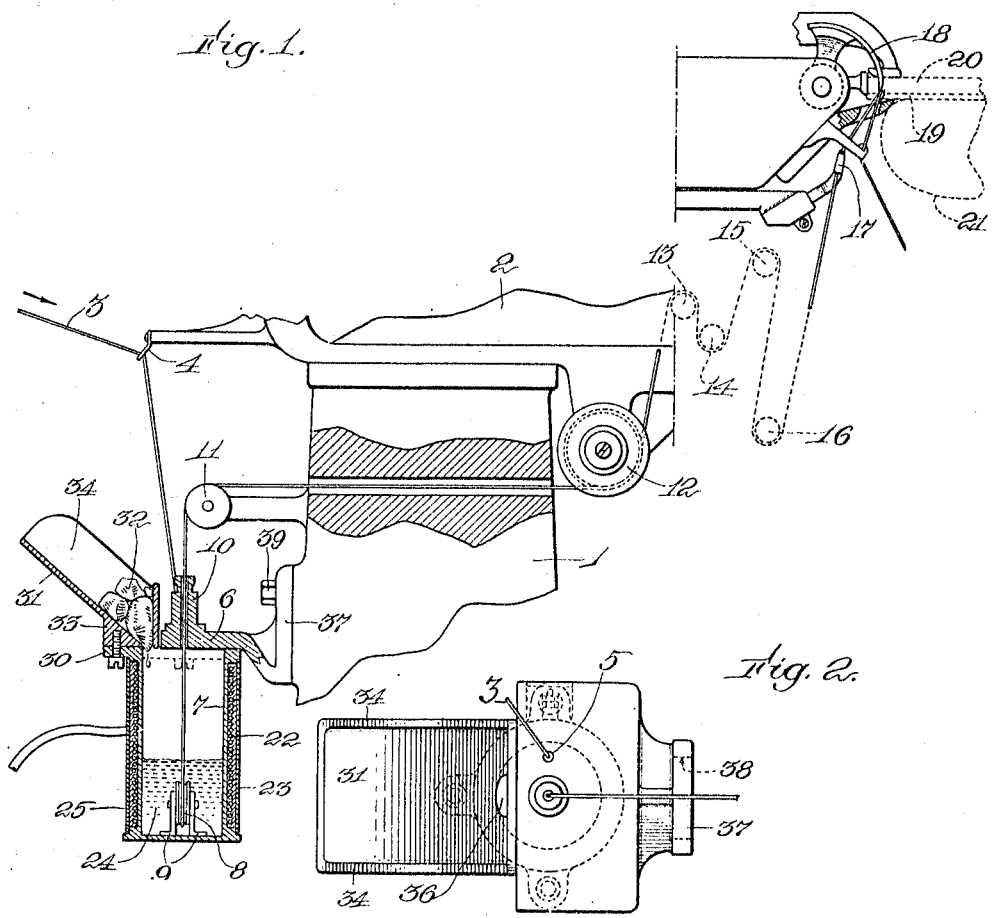
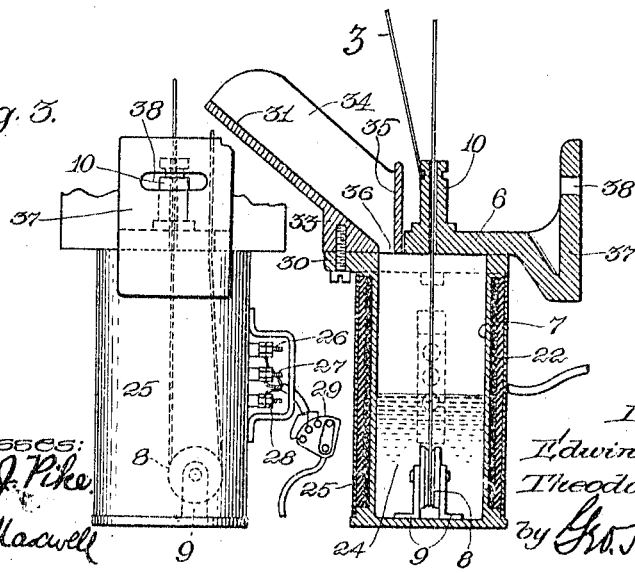
Witnesses:
Wm. J. Pike
Edward Maxwell
Inventors:
Edwin N. Chandler,
Theodore B. Lewis,
by Geo. H. Maxwell,
Attorney.

UNITED STATES PATENT OFFICE.

EDWIN N. CHANDLER, OF BROCKTON, AND THEODORE B. LEWIS, OF CAMBRIDGE, MASSACHUSETTS, ASSIGNORS TO SIMPLEX ELECTRIC HEATING COMPANY, OF BOSTON, MASSACHUSETTS, A CORPORATION OF MASSACHUSETTS.

ELECTRICALLY-HEATED WAX-POT FOR SHOE-SEWING MACHINES.

990,109.  Specification of Letters Patent.  Patented Apr. 18, 1911.

Application filed March 19, 1909. Serial No. 484,493.

*To all whom it may concern:*

Be it known that we, EDWIN N. CHANDLER, a citizen of the United States, and resident of Brockton, in the county of Plymouth and State of Massachusetts, and THEODORE B. LEWIS, of Cambridge, in the county of Middlesex and State of Massachusetts, have invented an Improvement in Electrically-Heated Wax-Pots for Shoe-Sewing Machines, of which the following description, in connection with the accompanying drawings, is a specification, like letters on the drawings representing like parts.

Our invention is a wax pot for shoe machines, and has for its object the provision of means rendering it practicable to employ a small pot, small amount of wax, and minimum current.

In its preferred embodiment it consists of an electrically heated vessel wherein the heater surrounds the side walls of the pot or vessel, which is provided with suitable flanges or lugs for supporting the same fixedly with relation to means for delivering the thread into the wax within the pot and from the pot after it is waxed.

The pot contains means for providing a slow, uniform admission of fresh wax, for properly replenishing the supply in the pot and automatically maintaining a sufficient amount therein for use, notwithstanding the relatively small size of the vessel, so that the wax is supplied approximately as required by the thread passing through the pot. The metal portion of the pot is kept at a relatively high temperature by having the heater applied directly to, and as a part of, the wall of the pot, the latter being preferably covered with an insulating casing or jacket, and the upper part or supply portion of the pot is maintained at a relatively low temperature by being heated indirectly, by conduction from the more highly heated lower portion of the pot.

A further feature of our invention is of peculiar value in connection with a thread-waxing machine such as the ordinary Goodyear stitcher. In a machine of this kind it is important to secure, first, means for quickly melting the wax in the morning when it is desired to put the machine in operation, and second, to prevent overheating the wax and consequently injuring or rotting the thread and rendering the wax so thin that an insufficient amount will cling to the thread. We attain these two apparently conflicting objects by constructing the heaters of approximately four times the heat capacity required for a normal working temperature, so that, in starting, approximately four times the normal amount of energy may be applied to the pot for quickly heating the whole mass of wax to the proper consistency, and then, by changing the switch, the heat may be maintained thereafter at normal running temperature. To this end the pot also is preferably small in size, and the heat control is secured by applying the windings directly in proper distribution over the walls of the pot.

The further constructional details of our invention will appear fully from the following description, taken with reference to the accompanying drawings.

In the drawings, Figure 1 represents in vertical section a sufficient portion of a Goodyear stitcher, having our wax pot applied thereto, to enable the same to be fully apprehended; Fig. 2 is a top plan view of the pot separate from the rest of the machine; Fig. 3 is a view in elevation looking toward the left of Figs. 1 and 2; and Fig. 4 is an enlarged central vertical sectional view of the pot, similar to Fig. 1.

A suitable pedestal 1 carries the sewing machine head 2, only a portion of which is herein shown. The thread 3 is drawn from a spool or other source of supply (not shown) and passes down through a guiding loop 4 and thread eye 5 through the top 6 of the electrically heated wax pot 7 into the fluid wax, and about a guide wall 8 fixedly mounted on supports 9 in the bottom of the pot, and thence out to the top guide and stripper 10 and over a guide pulley 11 through the heated pedestal 1 to the various directing devices 12, 13, 14, 15, 16, 17, and finally to the needle 18 and other stitch-forming mechanism which serve to sew the welt 19 to the sole 20 of the boot or shoe 21 as indicated in dotted lines Fig. 1. The pot 7 is cut away or reduced in size throughout the greater portion of its length, up and down, and provided with electric resistance or heating wire 22 embedded in fused porcelain or other suitable insulator 23 which serves to hold the wire 22 in direct heating engagement with the adjacent wall of the pot, so that the lower part of the pot which contains the metal wax as indicated at 24 is maintained highly heated. An insulating jacket or case 25 surrounds and protects the heater. The resistance wire 22 is wound for properly distributing the required amounts of heat in connection with binding posts 26, 27, 28 controlled by a switch 29 at one side of the pot. Secured to a top flange of the pot at 30 we provide an inclined metal shelf 31 of suitable form and size to receive the required amount of wax 32 to be melted for replenishing the pot. This shelf, being attached to the top of the pot, receives sufficient heat by conduction from the latter to melt the wax at the required rate for the satisfactory automatic renewing of the supply at 24 as it is used by the passage of the thread. To promote the heat conduction, the flange 30 is made relatively large in mass and the shelf is also given a correspondingly large mass of metal at 33 in contact with said flange. The shelf 31 has opposite flanges or sides 34 and a front stopwall 35 and is provided at its lowest part with a restricted opening 36 best shown in Fig. 2, which permits the wax to feed slowly to the pot according to the requirements of the machine. At its opposite side the pot is provided with a relatively heavy securing flange 37 having an opening 38 for a bolt 39 by which it is conveniently secured to the pedestal 1.

In use, the switch 29 is turned to its high-temperature position so as to throw in all the windings 22 at the time the machine proper is to be started in the morning, and thereby the wax in the lower part of the pot is quickly melted, whereupon the switch is turned to its medium-temperature position or low-temperature position, according to the work that the machine is to be operated upon or the other requirements of the special operator, and thereby the wax is thereafter maintained in the required highly fluid condition, while the conductively heated wax supply at the top of the pot is so moderately heated that it is melted relatively slowly and caused to drip more or less continuously from the supply orifice 36. The thread is passed through the wax downwardly and then upwardly about the directing wall 8, and then through the top guide post 10 and over the various pulleys, tension devices, and other parts of the sewing machine to the stitching mechanism at the work 19–21.

The pot is preferably composed of cast iron or other metal, and the heater is applied thereto through the medium of a suitable insulating material directly to the walls of the pot. Said medium is preferably vitreous enamel fused directly on the walls of the pot.

A further feature of our invention is the projecting shelf or flange preferably inclined at such an angle as to cause the wax as it melts to run or slide downwardly toward the pot and drip thereinto, said shelf or flange having means for preventing the unmelted wax from slipping into the pot. By our arrangement, the heat supply is distributed over the side walls of the pot so that, during the period of operation, uniformity of temperature of the wax is secured, this being of importance in connection with using waxed thread.

Our apparatus saves the operator the trouble of constantly watching the pot, as, when once properly heated, it maintains itself in approximately correct running condition thereafter without care, the low-temperature position of the switch insuring a normal heat which is ordinarily exactly what is wanted for the usual thread and rapidity of work, and the automatic replenishing means insuring an ample supply without an excessive supply and preventing the pot running empty.

A feature of material importance is the construction of the pot 7 of considerable depth, closed at the top except for the wax inlet and having the thread guided vertically therefrom to a support some distance without the pot. Owing to these matters of construction the heated air in the interior of the pot can only find outlet by passing in contact with the unmelted wax, thereby facilitating the melting thereof. As the thread is drawn vertically from the body of melted wax up through the confined heated air in the top of the pot, the wax remaining melted during the passage through such confined heated air will more evenly impregnate and coat the thread than would be the case were the pot open or the delivery of the thread therefrom oblique or horizontal. Also as the supporting guide pulley 11 is some little distance without the pot, the wax on the thread has opportunity to become cooled before engagement therewith.

By our invention great economy of valuable space is effected in the sewing machine, temperature control is accomplished most effectively, and, as already pointed out, the lower portion of the pot is maintained highly heated while the upper part preserves a low temperature. The apparatus has a high degree of efficiency due to its small construction and the direct conduction of heat through the heater to the wax, having interposed only the metal and the insulation. The ease of replenishing the wax supply is a further advantage, and this is accomplished with a small expenditure of heat, the partially melted wax moving down by gravity to a warmer part of the iron and dripping into the heated wax. This whole feature makes it practicable to replenish the wax satisfactorily in a small vessel such as our wax pot; without this feature either the pot would have to be large or the wax would have to be melted at some other point and brought in a melted state to the machine, but this difficulty is obviated by the shelf or flange heated by conduction from the main heater in the lower part of the small pot. A further advantage of having the vessel of relatively small capacity and bulk is, aside from cost of manufacture, that it is more readily heated and more quickly brought into condition for work, because, having a small mass as to the vessel and the contained wax to be heated, less time and current are required.

Having described our invention, what we claim as new and desire to secure by Letters Patent is, 1. In a shoe machine, the combination with sewing means for operating upon a shoe with waxed thread, of means for delivering melted wax to the thread, comprising a wax pot provided with a closed top, an inclined wax-holder having a small wax-inlet opening through said top, the latter also having a vertical thread opening very slightly larger than the thread, a thread supporting guide vertically above the thread opening in position to maintain the thread in a vertical position exactly centered in said thread opening so that the thread will be out of contact with the walls of the thread opening, and means for heating said pot, whereby the heated air from the pot can only pass out through said small wax-inlet opening to keep the wax melted at that point and out through the small thread-opening thereby operating to strip the surplus wax uniformly from the thread by said heat action as distinguished from mechanical action.

2. In a shoe machine, the combination with sewing means for operating upon a shoe with waxed thread, and means for delivering melted wax to said thread, of a wax-pot having heat-transmitting walls, an electric sectional heater and switch for controlling said sectional heater constructed to apply heat directly to the walls of said pot and to deliver a larger amount of current to the bottom of the pot than elsewhere, whereby the wax may be quickly melted by a high heat at the beginning of operating the machine and thereafter maintained uniformly warmed by a low heat.

In testimony whereof, we have signed our names to this specification, in the presence of two subscribing witnesses.

EDWIN N. CHANDLER.
THEODORE B. LEWIS.

Witnesses:
  ELIZABETH M. CONLIN,
  DORA A. PROCTOR.